United States Patent
Hubert et al.

(10) Patent No.: US 11,063,680 B2
(45) Date of Patent: Jul. 13, 2021

(54) METHOD FOR FUNCTIONALLY SECURE CONNECTION IDENTIFICATION

(71) Applicant: Siemens Aktiengesellschaft, Munich (DE)

(72) Inventors: Johannes Hubert, Burgthann (DE); Thomas Markus Meyer, Nuremberg (DE); Herbert Barthel, Herzogenaurach (DE); Maximilian Walter, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 42 days.

(21) Appl. No.: 16/688,415

(22) Filed: Nov. 19, 2019

(65) Prior Publication Data

US 2020/0162178 A1 May 21, 2020

(30) Foreign Application Priority Data

Nov. 20, 2018 (EP) .................................. 18207295

(51) Int. Cl.
*H04J 3/06* (2006.01)
*H04L 29/06* (2006.01)

(52) U.S. Cl.
CPC .......... *H04J 3/0661* (2013.01); *H04J 3/0673* (2013.01); *H04L 63/0485* (2013.01); *H04L 63/123* (2013.01); *H04L 2463/121* (2013.01)

(58) Field of Classification Search
CPC ... H04J 3/0661; H04J 3/0673; H04L 63/0485; H04L 63/123; H04L 2463/121;
(Continued)

(56) References Cited

U.S. PATENT DOCUMENTS

| | | | | |
|---|---|---|---|---|
| 9,398,076 | B2* | 7/2016 | Igoe | ................. H04N 21/42204 |
| 2004/0243902 | A1* | 12/2004 | Bruckner | .............. H04L 1/0082 |
| | | | | 714/746 |

(Continued)

FOREIGN PATENT DOCUMENTS

| | | |
|---|---|---|
| JP | 2001-333092 | 11/2001 |
| JP | 2002-232475 | 8/2002 |

(Continued)

OTHER PUBLICATIONS

Profibus—Profinet: "PROFisafe Systembeschreibung, Technologie and Anwendung", Profibus Nutzerorganisation E V PNO ED—Profibus Nutzerorganisation E V PNO, Internet Citation, pp. 1-26, section 4.1; Nov. 2010.

(Continued)

*Primary Examiner* — Lan-Huong Truong
(74) *Attorney, Agent, or Firm* — Cozen O'Connor

(57) ABSTRACT

A method for functionally secure connection identification for data exchange via a telegram between a source data service and a sink data service, wherein whether the time stamp of an incoming telegram is older than the time stamp of a predecessor telegram is determined, upon receipt of the predecessor telegram a monitoring counter being started and whether the currently incoming telegram has arrived within a monitoring time is additionally determined, where a local time stamp of a local time basis is compared with the associated time stamp of the incoming telegram and whether a comparison difference does not exceed a period of time is determined, a telegram arriving only being accepted as valid if the time stamp of the arriving telegram is greater than the time stamp of the telegram most recently accepted as valid, and data is valid if the checks are positive, otherwise a fail-safe reaction is triggered.

11 Claims, 4 Drawing Sheets

(58) Field of Classification Search
CPC ........... H04L 2012/40221; H04L 67/12; H04L 12/40; H04L 69/22; H04L 69/40; H04L 1/0045; H04L 63/108; H04L 63/126
See application file for complete search history.

(56) References Cited

U.S. PATENT DOCUMENTS

| | | |
|---|---|---|
| 2009/0041055 A1 | 2/2009 | Yamazaki et al. |
| 2009/0119437 A1* | 5/2009 | Hilscher ........... H04L 12/40013 710/305 |
| 2012/0254958 A1 | 10/2012 | Budampati et al. |
| 2013/0114606 A1 | 5/2013 | Schrum, Jr. et al. |
| 2015/0006661 A1 | 1/2015 | Choi et al. |
| 2017/0006095 A1 | 1/2017 | Jiang et al. |
| 2017/0026144 A1 | 1/2017 | Zinner |
| 2018/0013506 A1 | 1/2018 | Rotter et al. |
| 2018/0091245 A1 | 3/2018 | Leyrer et al. |

FOREIGN PATENT DOCUMENTS

| | | |
|---|---|---|
| JP | 2009-044673 | 2/2009 |
| JP | 2014-534779 | 12/2014 |
| JP | 2017-034671 | 2/2017 |
| JP | 2017-152767 | 8/2017 |
| KR | 1020100021188 | 2/2010 |
| KR | 1020160099662 | 2/2010 |

OTHER PUBLICATIONS

EP Search Report dated Apr. 17, 2019 based on EP18207295 filed Nov. 20, 2018.

Office Action dated Feb. 25, 2021 issued in India Patent Application No. 201934035241.

Office Action dated Mar. 4, 2021 issued in Japanese Patent Application No. 2019-140371.

* cited by examiner

METHOD FOR FUNCTIONALLY SECURE CONNECTION IDENTIFICATION

BACKGROUND OF THE INVENTION

1. Field of the Invention

The invention relates to the technical field of fail-safe communication, which is used inter alia for communication between field devices, controller components and similar facilities in safety-related industrial process automation or manufacturing automation and, more particularly, to a method for functionally secure connection identification for a data exchange via a telegram between a source data service and a sink data service via a communication channel in a communication system, where the source data service is assigned a unique identifier, and in each case a time stamp is allocated to a telegram to be transmitted in the source data service.

2. Description of the Related Art

One such fail-safe communication, also called F-communication, is used in particular in safety-related applications, in particular when errors in communication may lead to hazards for people, animals or material assets. A safety-oriented communication connection via PROFIsafe in a point-to-point connection is known. Since, however, in the developing communication technology, there are also concepts such as publisher/subscriber, broadcast or multicast mechanisms, which are not able to be sufficiently supported by point-to-point connections, a solution is sought here.

In accordance with the currently known prior art, a point-to-point connection is established as part of fail-safe communication (PROFIsafe). Via this point-to-point connection, bidirectional data has always been sent, which at least consisted of one acknowledgment telegram. In protocols such as PROFIsafe, it was also possible for the acknowledgment telegram to contain useful data. Via the previous interaction of the bidirectional communication, the two pieces of connection data have always mutually monitored one another.

SUMMARY OF THE INVENTION

In view of the foregoing, it is therefore an object of the present invention to provide a method for functionally secure connection identification for a data exchange, where preferably communication concepts such as publisher/subscriber can be used.

This and other objects and advantages are achieved in accordance with the invention by a method in which a check is performed in the sink data service to determine whether the time stamp of a telegram currently incoming is older than the time stamp of a predecessor telegram, where upon receipt of the predecessor telegram, a monitoring counter is started and a check is additionally performed to determine whether the telegram currently incoming has arrived within a predeterminable monitoring time. Furthermore, in the sink data service, a local time stamp of a local time basis is compared with the associated time stamp of the telegram currently incoming a check is performed to determine whether a difference resulting from the comparison does not exceed a predeterminable period of time. A telegram arriving in the sink data service is then only accepted as valid, if it is additionally fulfilled that the time stamp of the arriving telegram is greater than the time stamp of the telegram most recently accepted as valid, where in a final step the data is declared valid if the preceding checks have turned out positively, otherwise a fail-safe reaction is triggered.

Advantageously, a solution is now indicated, in which a concept for a safety protocol and safety communication functions is provided, which no longer requires a feedback channel (acknowledgment). It is now advantageously possible for a publisher/subscriber or for a broadcast operation or similar types of communication to be used. A safety protocol layer always functions in one direction and no longer needs any feedback channel or acknowledgment. This means that a receiver must receive all the information relating to safety about the telegram sent. The transmitter no longer needs to know whether a receiver has received something. The transmitter only continues to function as a data source.

In accordance with the invention, in this type of communication an acknowledgment telegram is no longer necessary, meaning that types of communication are possible which are not based on a point-to-point type of connection. Since it is now possible, with this fail-safe communication method and the connection identification, to use free types of communication for safety-oriented connections, these fail-safe applications can be realized in a significantly more flexible manner in customer installations.

Accordingly, the method for the fail-safe connection identification is maintained in a very simple manner and accordingly a lower safety overhead is thus to be realized in software functions, which leads to good runtime or optimal performance. Compared to previous safety protocols, which require complicated state machines due to the acknowledgment telegram, and the mutual protections associated therewith, significantly elaborate protocols have been implemented. It is now advantageously the case that the transmitted "safety" telegram itself ensures the logical protections via the time stamp for the data sink function based on the data contained in the safety telegram.

Furthermore, it is also considered to be advantageous if, via the unique identifier, the allocation of the sink data service to the correct source data service is ensured. To this end, the identifier is both known at the source data service and also at the sink data service and the sink data service has to check whether the data originates from the desired source data service.

For a time synchronization, the local time basis in the sink data service for determining the local time stamp via a safety-oriented time server is advantageously synchronized with the time basis in the source data service. The method is advantageously used in an automation installation, in which the communication between automation devices is configured to be functionally secure and operates in accordance with the publisher/subscriber, broadcast or multitask mechanism, where a safety protocol is used.

It is also an object of the present invention to provide an automation system with an automation controller, in which a source data service provides telegrams for automation devices with a sink data service in each case, where the automation controller is configured such that the source data service is assigned a unique identifier, and has a device which in each case allocates a time stamp to a telegram to be transmitted, where the automation devices are configured such that they comprise a checking device, with which it is checked in the sink data service whether the time stamp of a telegram currently incoming is older than the time stamp of a predecessor telegram, where upon receipt of the predecessor telegram, a monitoring counter is started and a check is additionally performed to determine whether the telegram currently incoming has arrived within a predeterminable monitoring time. Moreover, in the sink data service, a local time stamp of a local time basis is compared with the associated time stamp of the telegram currently incoming and a check is performed to determine whether a difference resulting from the comparison does not exceed a predeterminable period of time. Here, a telegram arriving in the sink data service is then only accepted as valid, if it is additionally fulfilled that the time stamp of the arriving telegram is greater than the time stamp of the telegram most recently accepted as valid, where in a final step the data is declared valid if the preceding checks have turned out positively, otherwise a fail-safe reaction is triggered.

With an automation system of this kind, it is now possible to communicate between an automation controller as a source data service and at least one sink data service in automation devices in accordance with the publisher/subscriber communication method, because an acknowledgment mechanism is now no longer necessary. The functions in the sink data service make sure, based on the data contained in the safety telegram, whether the telegram transmitted is invalid.

In this context, it is furthermore advantageous if the devices are furthermore configured to allocate a unique identifier for ensuring the allocation of the sink data service to the correct source data service, and the checking device is furthermore configured to check this allocation.

For synchronization, a safety-oriented time server is present, which is connected to the automation controller and the automation devices to synchronize the local time basis in the sink data service for determining the local time stamp with the time basis for determining the transmit time stamp in the source data service.

In summary, if the source data services transmit telegrams and the sink data services receive this data contained in the telegrams, then the sink data services should not need to send any response to the source data services. This results in the following safety-oriented technical considerations:
 a) Ensuring the correct data source functions.
 b) Monitoring the data source function or the transmission path for failure.
 c) Up-to-date status of the data.
 d) Monitoring for undesired repetition sequences.
 e) Monitoring the correct order.
 f) Buffered data on restart.
 g) Monitoring the data integrity.

Should one of the described technical criteria be nonconforming, then a sink data service must identify this and be able to derive a safety-oriented reaction therefrom (e.g., output of substitute values). The source data service cannot ensure these verifications, but must, however, supply corresponding data so that the sink data service can identify an error. The source data service provides data on an ongoing basis and the sink data service decides whether the data is valid, in order to accept it or not.

a) With respect to technical consideration, the use of a unique address, which describes the source data, service may, e.g., also be achieved by a UUID being used. This address must then be known at the source and the sink, and the sink consequently needs to check whether the data also originates from the desired source.

With respect to technical consideration b) and c), one time stamp per telegram to be transmitted is formed in the source data service, which is verified in the sink data service. This means that it should be verified that a positive change in the time stamp occurs within a certain monitoring time. In this context, the monitoring time is application-specific and part of a configuration of the fail-safe communication. For each transmission of a new telegram, the source data service also sends a new time stamp. By way of the time stamp and the verification of the monitoring time, the problem of the up-to-date status of the data or the failure of the source data service or of the transmission path is solved.

In order for no repetition sequence, alt-telegrams or telegrams in the wrong order to be accepted as valid by the sink data service, the sink data service additionally has to check the time stamp so that telegrams are only accepted when the newly received time stamp is greater than the time stamp most recently accepted as valid. This solves the problem of the correct order and undesired repetition sequences.

With respect to technical consideration f), the sink data service must check the received time stamp against its locally determined time. A time difference must lie within the configured monitoring time. If this is not the case, then a safety-oriented reaction is performed and a new start must be acknowledged. In order to be in control of changes in time between the sink data service and the source data service on a new start, the source data service is only permitted to adopt the system time on a new start. The subsequent time stamp formation must then be performed within the sink data service. The sink data service adopts the system time on a new start upon receiving a first valid telegram. The subsequent time stamp formation must then be performed within the source data service.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

One exemplary embodiment of the method according to the invention and the automation system according to the invention is explained below with reference to the drawing, in which.

DETAILED DESCRIPTION OF THE EXEMPLARY EMBODIMENTS

Figure 1:
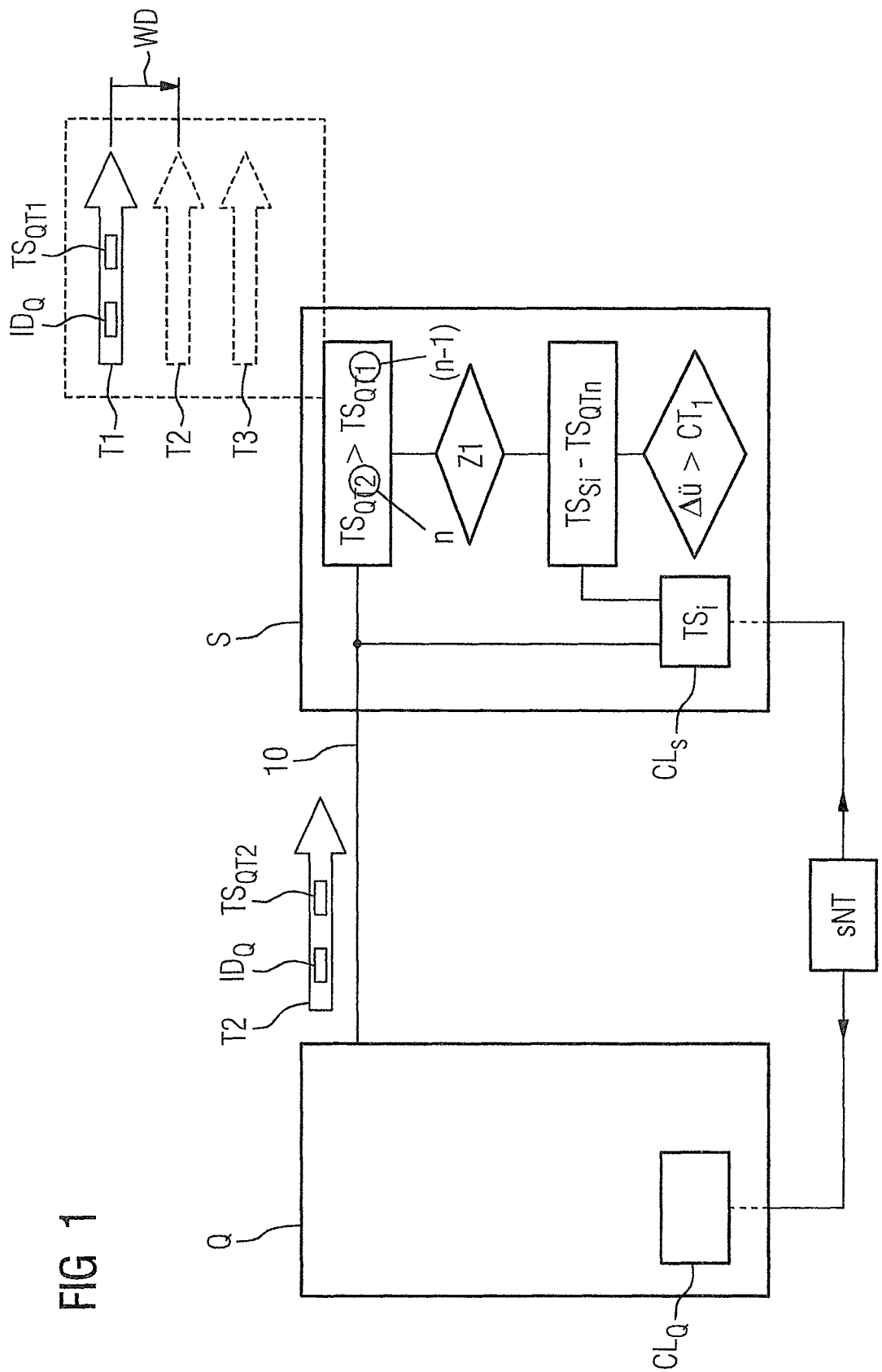
FIG. 1 shows a secure connection identification in accordance with the invention.

In accordance with FIG. 1, a source data service Q and a sink data service S are represented, with which a method for functionally secure connection identification for a data exchange via a telegram T is performed. The source data service Q is assigned a unique identifier $ID_Q$ and each telegram T to be transmitted is allocated a time stamp $TS_Q$. By way of example, a second telegram T2 is currently being sent via the communication channel 10 from the source data service Q, where a first telegram T1 has already arrived previously at the sink data service S. The second telegram T2 has the identifier $ID_Q$ and a second time stamp $TS_{QT2}$.

In the dashed box above the sink data service S, the telegrams T are indicated. The first telegram T1 has already arrived, the second telegram T2 and the third telegram T3 are still yet to arrive in the future.

A check is now performed in the sink data service S to determine whether the time stamp $TS_{QT2}$ of the currently incoming second telegram T2 is older than the time stamp $TS_{QT1}$ of the predecessor telegram T1, where upon receipt of the predecessor telegram T1 a monitoring counter WD is started and a check is additionally performed to determine whether the currently incoming telegram T2 has arrived within a predeterminable monitoring time Z1.

Moreover, in the sink data service S a local time stamp $TS_{Si}$ of a local time basis CLs is compared with the associated time stamp $TS_{QT2}$ of the currently incoming telegram T2 and a check is performed to determine whether a difference Δü resulting from the comparison does not exceed a predeterminable period of time CT1.

A telegram T1,T2,T3 arriving in the sink data service S is then only perceived as valid if it is additionally fulfilled that the time stamp $TS_{T2}$ of the arriving telegram T2 is greater than the time stamp $TS_{QT1}$ of the telegram T1 most recently accepted as valid, where during a final step the data is declared valid if the preceding checks have turned out positively, otherwise a fail-safe reaction is triggered.

The sink data service S checks whether the data originates from a desired source data service Q. This is ensured via the unique identifier $ID_Q$. To this end, the identifier $ID_Q$ is both known at the source data service Q and also at the sink data service S.

The local time basis $CL_S$ of the sink data service S is synchronized with the local time basis $CL_Q$ of the source data service Q via a safety-oriented time server sNT.

Figure 2:
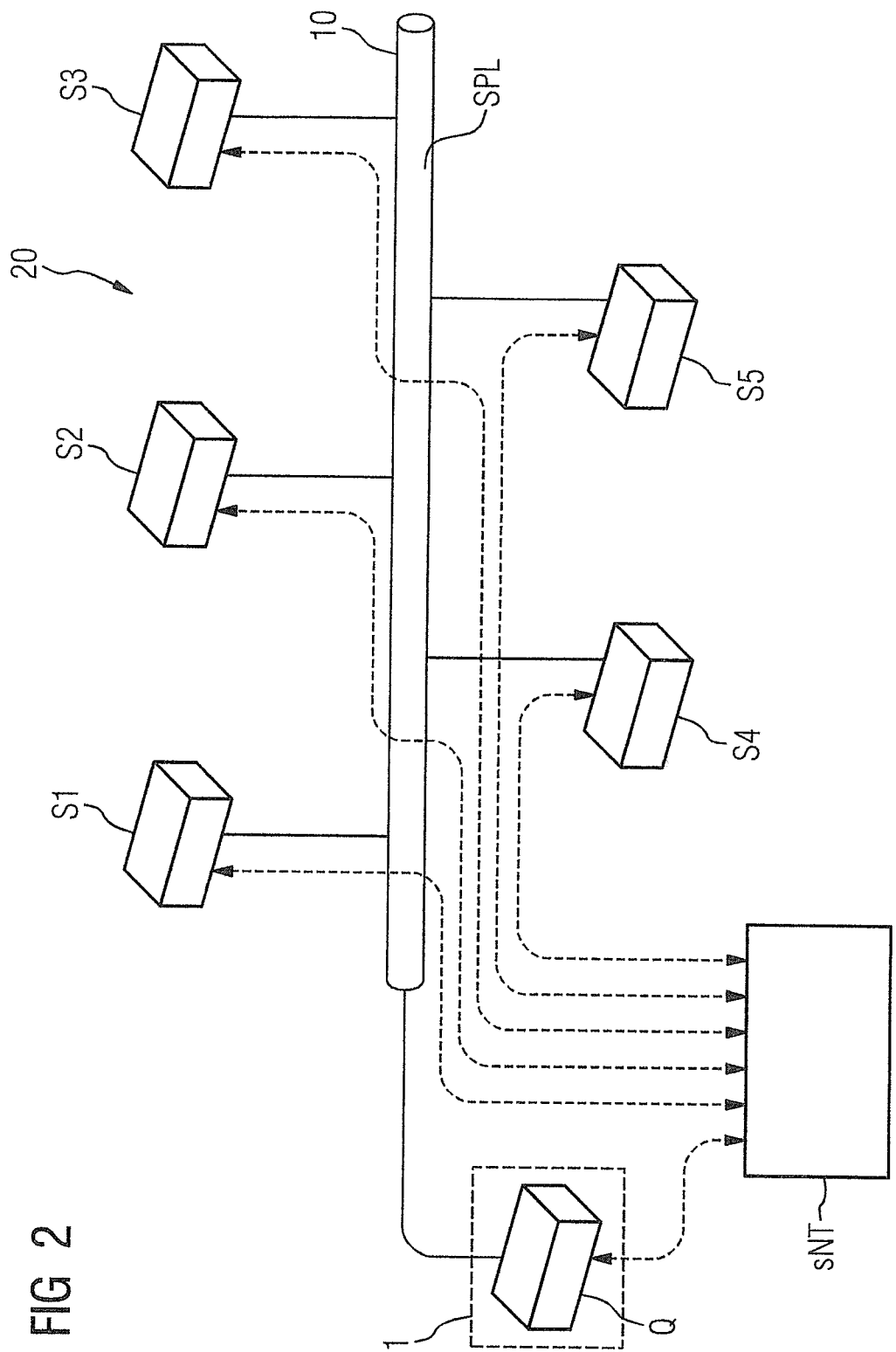
FIG. 2 shows a schematic representation of an automation system in a broadcast operation in accordance with the invention.

FIG. 2 shows a schematic representation of the principle of a broadcast mechanism between a source data service Q and a first sink data service S1, a second sink data service S2, a third sink data service S3, a fourth sink data service S4 and a fifth sink data service S5. All communication participants cited previously are connected to the communication channel 10. The communication channel 10 is configured as a safety protocol layer SPL. If the source data service Q now sends a telegram T to all sink data services S1,S2,S3,S4,S5 in a broadcast service, then the method explained in FIG. 1 proceeds in each sink data service S1,S2,S3,S4,S5. It is now advantageous that a safety-oriented connection can be established here without the sink data services S1,S2,S3,S4,S5 having to acknowledge the receipt of a telegram T at the source data service Q, because all information is already contained in the received telegram T for checking and, particularly via the synchronization of the safety-oriented time server (dashed lines), the checks with regard to the monitoring time can proceed.

Figure 3:
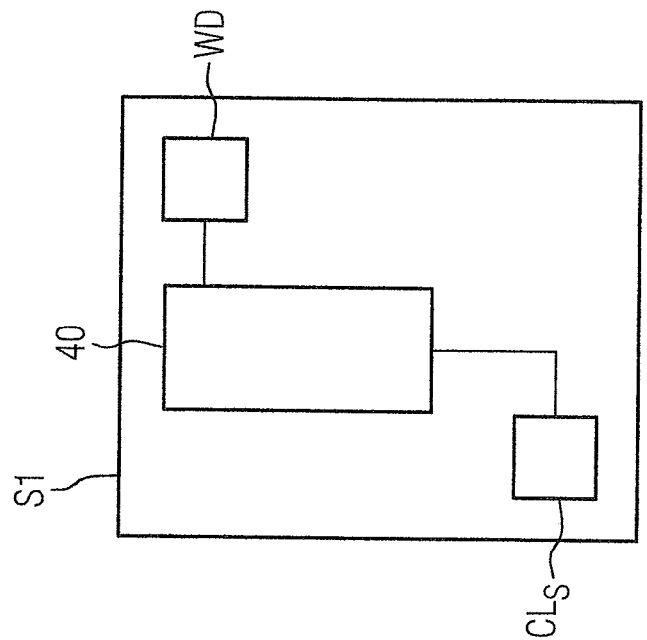
FIG. 3 shows a detailed representation of a source data service and a sink data service in accordance with the invention.
Figure 3:
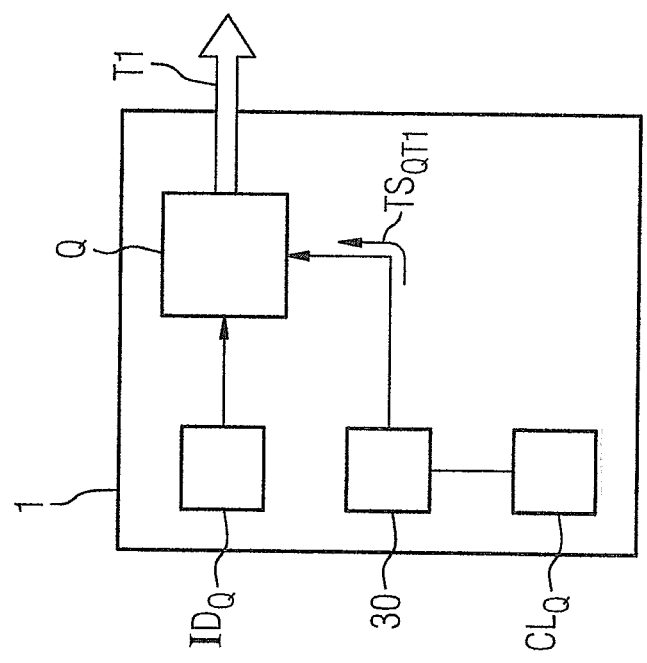

A source data service Q and a sink data service Si is shown in FIG. 3. The source data service Q is implemented in an automation controller 1, for example. The automation controller 1 is then configured such that a unique identifier $ID_Q$ is assigned in the source data service Q, and the device 30 is present, which allocates a time stamp $TS_{QT1}$ to each telegram T1 to be transmitted.

An associated automation device S1 is configured here such that it comprises a checking device 40, with which a check is performed in the sink data service S to determine whether the time stamp $TS_{QT2}$ of a telegram currently incoming is older than the time stamp of a predecessor telegram, where upon receipt of the predecessor telegram, a monitoring counter WD is started and it is additionally performed to determine whether the telegram T currently incoming has arrived within a predeterminable monitoring time Z1. Moreover, in the sink data service S, a local time stamp $TS_{QT1}$, $TS_{QT2}$ of the telegram T currently incoming is compared with that of a predecessor telegraph and a check is performed to determine whether a difference resulting from the comparison does not exceed a predeterminable period of time. A telegram arriving in the sink data service S is then only accepted as valid, if it is additionally fulfilled that the time stamp of the arriving telegram T is greater than the time stamp of the telegram most recently accepted as valid, where during a final step the data is declared valid if the preceding checks have turned out positively, otherwise a fail-safe reaction is triggered.

Figure 4:
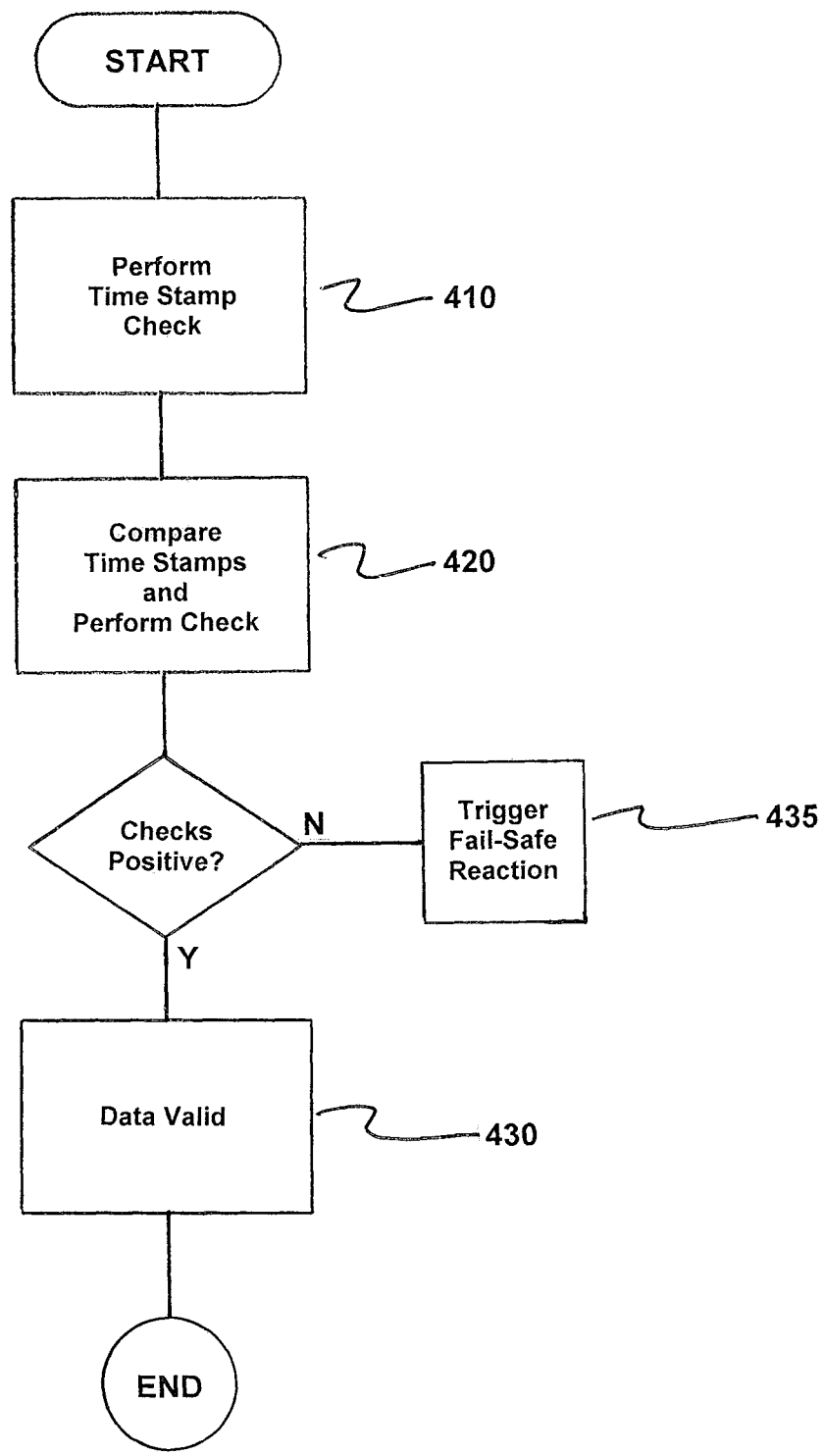
FIG. 4 is a flowchart of the method in accordance with the invention.

FIG. 4 is a flowchart of the method for functionally secure connection identification for a data exchange via a telegram T between a source data service Q and a sink data service S via a communication channel 10 in a communication system 11, where the source data service Q is assigned a unique identifier $ID_Q$, and a time stamp $TS_{QT1}$, $TS_{QT2}$ is allocated to each telegram T1,T2,T3 to be transmitted in the source data service Q. The method comprises performing a check in the sink data service S to determine whether a time stamp $TS_{QT2}$ of a currently incoming telegram T2 is older than a time stamp $TS_{QT1}$ n of a predecessor telegram T1, as indicated in step 410. In accordance with the invention, upon receipt of the predecessor telegram T1 a monitoring counter WD is started and a check is additionally performed to determine whether the currently incoming telegram T2 has arrived within a predeterminable monitoring time Z1.

Next, a local time stamp $TS_{Si}$ of a local time basis $CL_S$ in the sink data service S is compared with the time stamp $TS_{QT2}$ of the currently incoming telegram T2 and performing a check is performed to determine whether a difference ΔÜ resulting from the comparison does not exceed a predeterminable period of time CT1, as indicated in step 420. Here, a telegram T1,T2,T3 arriving in the sink data service S is then only accepted as valid if the time stamp $TS_{T2}$ of the arriving telegram T2 is greater than the time stamp $TS_{T1}$ of the telegram T1 most recently accepted as valid is additionally fulfilled.

Next, the data valid is declared valid if the preceding checks are positive, as indicated in step 430 otherwise a fail-safe reaction is triggered, as indicated in step 435.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for functionally secure connection identification for a data exchange via a telegram between a source data service and a sink data service via a communication channel in a communication system, the source data service being assigned a unique identifier, and a time stamp being allocated to each telegram to be transmitted in the source data service, the method comprising:
performing a check in the sink data service to determine whether a time stamp of a currently incoming telegram is older than a time stamp of a predecessor telegram, upon receipt of the predecessor telegram a monitoring counter being started and a check being additionally performed to determine whether the currently incoming telegram has arrived within a predeterminable monitoring time;
comparing a local time stamp of a local time basis in the sink data service with the time stamp of the currently incoming telegram and performing a check to determine whether a difference resulting from the comparison does not exceed a predeterminable period of time, a telegram arriving in the sink data service being then only accepted as valid if the time stamp of the arriving telegram is greater than the time stamp of the telegram most recently accepted as valid is additionally fulfilled;
declaring the data valid if said preceding checks are positive, otherwise triggering a fail-safe reaction.

2. The method as claimed in claim 1, wherein the allocation of the sink data service to the correct source data service is ensured via the unique identifier; and wherein the identifier is known to the source data service and also known at the sink data service, and the sink data service must perform a check to determine whether the data originates from a desired source data service.

3. The method as claimed in claim 1, wherein the local time basis in the sink data service for determining the local time stamp is synchronized with the time basis in the source data service via a safety-oriented time server.

4. The method as claimed in claim 2, wherein the local time basis in the sink data service for determining the local time stamp is synchronized with the time basis in the source data service via a safety-oriented time server.

5. The method as claimed in claim 1, wherein the method is implemented in an automation installation, in which communication between automation devices occurs in a functionally secure manner and operates in accordance with a publisher/subscriber, broadcast or multitask mechanism; a safety protocol being implemented.

6. The method as claimed in claim 2, wherein the method is implemented in an automation installation, in which communication between automation devices occurs in a functionally secure manner and operates in accordance with a publisher/subscriber, broadcast or multitask mechanism; a safety protocol being implemented.

7. The method as claimed in claim 3, wherein the method is implemented in an automation installation, in which communication between automation devices occurs in a functionally secure manner and operates in accordance with a publisher/subscriber, broadcast or multitask mechanism; a safety protocol being implemented.

8. An automation system comprising:
an automation controller, in which a source data service provides telegrams for each automation device with a sink data service in each case, the automation controller being configured such that a unique identifier is assigned to the source data service;
a device which allocates a time stamp to each telegram to be transmitted;
wherein the automation devices are each configured such that they comprise a checking device, with which a check is performed in the sink data service to determine whether the time stamp of a currently incoming telegram is older than a time stamp of a predecessor telegram,
wherein upon receipt of the predecessor telegram a monitoring counter is started and a check is additionally performed to determine whether the currently incoming telegram has arrived within a predeterminable monitoring time;
a local time stamp of a local time basis is additionally compared with the associated time stamp of the currently incoming telegram in the sink data service and a check is performed to determine whether a difference resulting from the comparison does not exceed a predeterminable period of time, a telegram arriving in the sink data service then only being accepted as valid if the time stamp of the arriving telegram is greater than the time stamp of the telegram most recently accepted as valid is additionally fulfilled; and
wherein the data is declared valid if the preceding checks are positive, otherwise a fail-safe reaction is triggered.

9. The automation system as claimed in claim 8, wherein the device is further configured to allocate the unique identifier for ensuring allocation of the sink data service to the correct source data service, and wherein the checking device is further configured to check said allocation.

10. The automation system as claimed in claim 8, further comprising:
a safety-oriented time server which is connected to the automation controller and the automation devices to synchronize the local time basis in the sink data service for determining the local time stamp via a time basis in the source data service.

11. The automation system as claimed in claim 9, further comprising:
a safety-oriented time server which is connected to the automation controller and the automation devices to synchronize the local time basis in the sink data service for determining the local time stamp via a time basis in the source data service.

* * * * *